US008601275B2

(12) United States Patent
Nagura

(10) Patent No.: US 8,601,275 B2
(45) Date of Patent: Dec. 3, 2013

(54) INTER-VEHICLE COMMUNICATION SYSTEM

(75) Inventor: Michinaga Nagura, Kariya (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 13/091,173

(22) Filed: Apr. 21, 2011

(65) Prior Publication Data

US 2011/0264918 A1 Oct. 27, 2011

(30) Foreign Application Priority Data

Apr. 22, 2010 (JP) ................................. 2010-098952

(51) Int. Cl.
*H04L 9/32* (2006.01)
(52) U.S. Cl.
USPC .......................................... 713/179; 173/180
(58) Field of Classification Search
None
See application file for complete search history.

(56) References Cited

U.S. PATENT DOCUMENTS

| 4,110,558 | A  | * | 8/1978  | Kageyama et al. ............ 375/357 |
| 4,803,725 | A  | * | 2/1989  | Horne et al. ..................... 380/44 |
| 6,411,716 | B1 | * | 6/2002  | Brickell ......................... 380/286 |
| 6,426,693 | B1 | * | 7/2002  | Inomata .................... 340/539.21 |
| 6,731,755 | B1 | * | 5/2004  | Cocks ............................. 380/30 |
| 7,136,489 | B1 | * | 11/2006 | Madhusudhana et al. .... 380/277 |
| 7,181,615 | B2 | * | 2/2007  | Fehr et al. ...................... 713/156 |
| 7,466,444 | B2 | * | 12/2008 | Silverbrook et al. ........ 358/1.18 |
| 8,108,691 | B2 | * | 1/2012  | Holtzman et al. ............. 713/193 |
| 2006/0153189 | A1 | * | 7/2006 | Nitou ............................ 370/389 |

FOREIGN PATENT DOCUMENTS

| JP | A-2005-051734 | 2/2005 |
| JP | A-2006-222738 | 8/2006 |
| JP | A-2007-088737 | 4/2007 |
| JP | A-2008-060789 | 3/2008 |
| JP | A-2008-060809 | 3/2008 |
| JP | A-2009-081524 | 4/2009 |

OTHER PUBLICATIONS

Pannetrat ( "Efficient multicast packet authentication,", Feb. 2003).*

* cited by examiner

*Primary Examiner* — Saleh Najjar
*Assistant Examiner* — Oleg Korsak
(74) *Attorney, Agent, or Firm* — Posz Law Group, PLC

(57) ABSTRACT

A communication system for transmitting and receiving communication data together with signature data attached thereto for verifying the communication data. A transmission-side in-vehicle device of the system generates the signature data for each unit of communication data consisting of M×N (M>=N>=2) pieces of communication data, and repeatedly transmits M pieces of divided signature data in N rounds, attached to M×N corresponding pieces of communication data. A reception-side in-vehicle device of the system reconstitutes the unit of communication data from M×N pieces of received communication data, reconstitutes the signature data from M pieces of received divided signature data, and then verifies the reconstituted unit of communication data with the reconstituted signature data. This can prevent data missing of the signature data due to communication errors to thereby reliably verify the communication data.

5 Claims, 9 Drawing Sheets

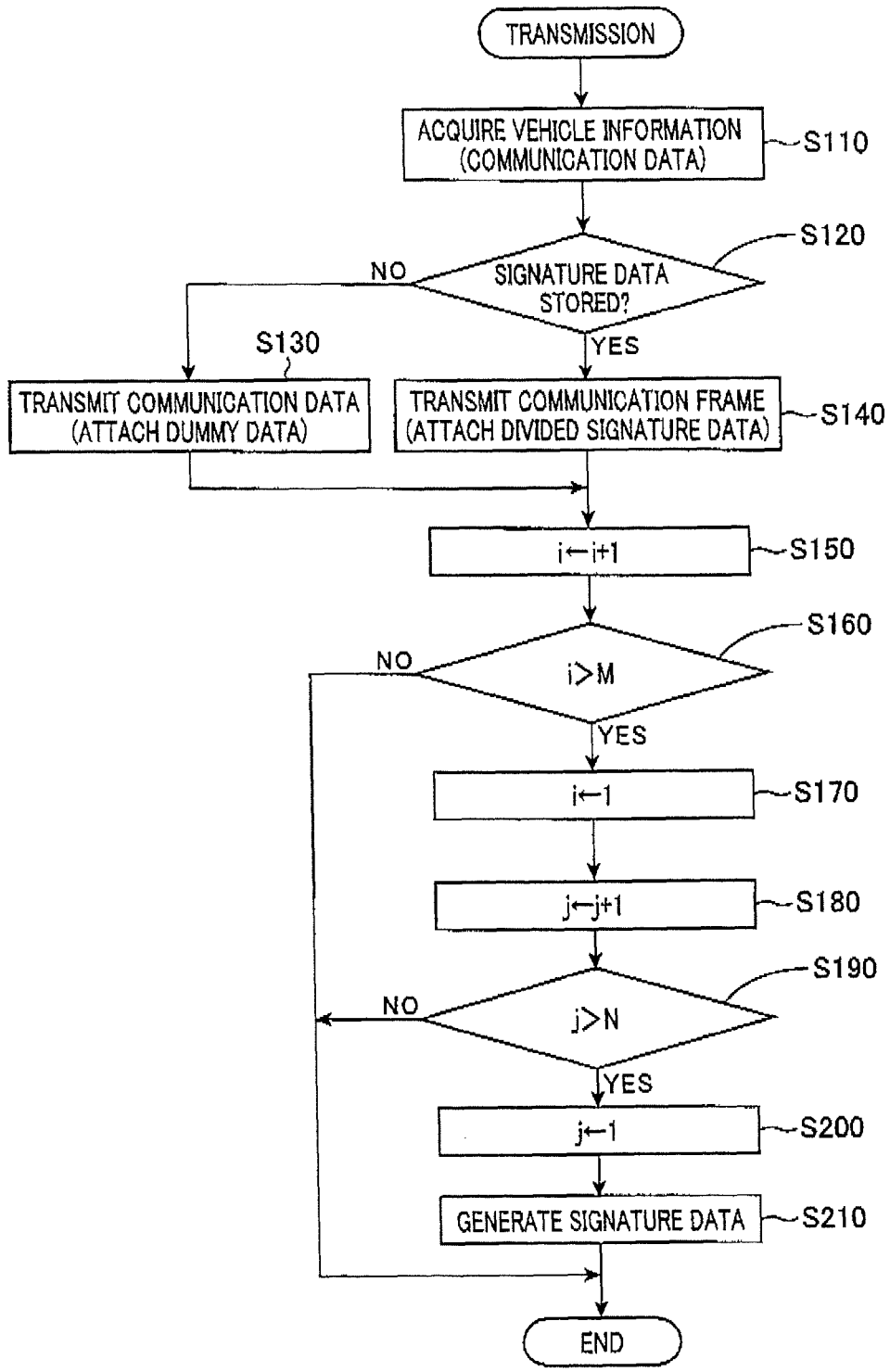

FIG.5

T0 - - - - - - - - - - - - - (ADDITIONAL DATA) - - - - - - - - - - - - - - - - - - - - -

| HEADER | COMMUNICATION DATA 1 | DUMMY | FOOTER |

| HEADER | COMMUNICATION DATA 2 | DUMMY | FOOTER |

⋮

| HEADER | COMMUNICATION DATA 2M | DUMMY | FOOTER |

UNIT OF DATA B1
(COMMUNICATION DATA 1 TO 2M)

DUMMY SIGNATURE DATA 0
(GENERATED FOR NOTHING)

T1 - - - - - - - - - - - - - - - - - - - - - - - - - - - - - - - - - - - - - - - - - - - -

| HEADER | COMMUNICATION DATA 2M+1 | DIVIDED SIGNATURE DATA 1-1 | FOOTER |

✗ | HEADER | COMMUNICATION DATA 2M+2 | DIVIDED SIGNATURE DATA 1-2 | FOOTER |

⋮

| HEADER | COMMUNICATION DATA 3M | DIVIDED SIGNATURE DATA 1-M | FOOTER |

| HEADER | COMMUNICATION DATA 3M+1 | DIVIDED SIGNATURE DATA 1-1 | FOOTER |

○ | HEADER | COMMUNICATION DATA 3M+2 | DIVIDED SIGNATURE DATA 1-2 | FOOTER |

⋮

| HEADER | COMMUNICATION DATA 4M | DIVIDED SIGNATURE DATA 1-M | FOOTER |

UNIT OF DATA B2
(COMMUNICATION DATA 2M+1 TO 4M)

SIGNATURE DATA 1
(DIVIDED SIGNATURE DATA 1-1 TO 1-M)
(GENERATED FOR B1)

T2 - - - - - - - - - - - - - - - - - - - - - - - - - - - - - - - - - - - - - - - - - - - -

| HEADER | COMMUNICATION DATA 4M+1 | DIVIDED SIGNATURE DATA 2-1 | FOOTER |

| HEADER | COMMUNICATION DATA 4M+2 | DIVIDED SIGNATURE DATA 2-2 | FOOTER |

⋮

| HEADER | COMMUNICATION DATA 6M | DIVIDED SIGNATURE DATA 2-M | FOOTER |

UNIT OF DATA B3
(COMMUNICATION DATA 4M+1 TO 6M)

SIGNATURE DATA 2
(DIVIDED SIGNATURE DATA 2-1 TO 2-M)
(GENERATED FOR B2)

T3 - - - - - - - - - - - - - - - - - - - - - - - - - - - - - - - - - - - - - - - - - - - -

| HEADER | COMMUNICATION DATA 6M+1 | DIVIDED SIGNATURE DATA 3-1 | FOOTER |

| HEADER | COMMUNICATION DATA 6M+2 | DIVIDED SIGNATURE DATA 3-2 | FOOTER |

⋮

UNIT OF DATA B4
(COMMUNICATION DATA 6M+1 TO 8M)

SIGNATURE DATA 3
(DIVIDED SIGNATURE DATA 3-1 TO 3-M)
(GENERATED FOR B3)

INTER-VEHICLE COMMUNICATION SYSTEM

CROSS-REFERENCE TO RELATED APPLICATION

This application is based on and claims the benefit of priority from earlier Japanese Patent Application No. 2010-98952 filed Apr. 22, 2010, the description of which is incorporated herein by reference.

BACKGROUND 1. Technical Field of the Invention

This invention relates to a communication system for transmitting and receiving communication data together with signature data attached thereto for verifying the communication data. 2. Related Art In recent years, there has been considered introduction of a system that is operative to exchange vehicle information, such as a vehicle location, a vehicle velocity, a travelling direction, and ON/OFF operation of a brake, with peripheral vehicles through inter-vehicle communications to notify the driver of one's own vehicle of a risk of collision with one or more of the peripheral vehicles, thereby avoiding an upon-meeting collision at a blind intersection before the collision occurs. Japanese Patent Application Publication No. 2009-081524 discloses such a system.

In the above system, one of the main objects is how to assure validity of communication data. There is known as a solution an electronic signature scheme based on the public key cryptosystem.

Specifically, according to the electronic signature scheme, verification data A (e.g., a message digest generated by a hash function) generated from the communication data to be verified is encrypted with a private key in the public key cryptosystem to generate encrypted data. The communication data is transmitted to a communication partner together with signature data attached thereto including the encrypted data, a public key used to decrypt the encrypted data, an electronic certificate to verify the public key. Upon reception of the signature data, the communication partner attempts to verify the received public key with the received electronic certificate, and then restores the verification data A by decrypting the encrypted data with the public key that has been verified. It is checked whether or not the received communication data has been tampered with by comparing the restored verification data A with verification data B generated from the received communication data. The received communication data is determined to be valid if the verification data A, B coincide.

In the electronic signature scheme based on the public key cryptosystem, however, a larger public key is required to assure higher reliability, which leads to larger signature data.

There exists a following disadvantage in the above scheme. In cases where a relatively small amount of communication data is allowed to be transmitted/received in each communication and is comparable in data amount to the signature data, an overhead for the signature data is increased, which leads to reduction in communication efficiency (see FIG. 11).

In particular, in the above inter-vehicle communication system, regular (or periodic) exchange of data is required. In addition, exchanged data (i.e., the vehicle information) in each communication is assumed to be about 100 bytes in size, while the signature data is 200 bytes or more in size. That is, when the signature data is attached to the data to be exchanged, a total amount of data required for each communication will be increased two or three fold.

An amount of data that can be exchanged in each communication (i.e., size of one communication frame) is determined by a baud rate and an allowable number of concurrent communication partners and other conditions.

A radius of an inter-vehicle communication area is here assumed to be 200 m, whose center is located at a traffic intersection of 4 roads each having 3 lanes on one side. Assuming that a plurality of vehicles are running spaced apart from each other with an average inter-vehicle distance of 10 m, there exist 20 vehicles per lane within a 200 m long segment of each road. Therefore, 3 lanes on one side×2 lanes on the other side×4 directions×20 vehicles per lane gives 480 vehicles within the area of 200 m radius, of course, which may depend on a traffic condition.

Assuming that each road is a high-speed way where the vehicle speed is 30 m/sec, and taking into account potential data missing due to communication errors or the like, a data transmission cycle is preferably limited to 100 ms or less such that the data missing effect on the communication control is made allowable. In addition, it may be assumed that the baud rate is around 10 Mbps, but which depends on an allocated bandwidth of radio waves.

Under such a condition, an amount of data that can be transmitted in each communication can be estimated from the following equation.

$$10 \times 10^6 \text{ [bps]} \times 0.1 \text{ [s]} / 480 \text{ [vehicles]} = 2083 \text{ [bits]}$$

That is, even in the absence of transmission loss, the data amount can take nothing more than about 260 bytes. In addition, an increasing packet density leads to significant reduction in communication efficiency due to frequent occurrence of packet collisions. Therefore, it is said that the data amount is actually limited to under about 30% of 260 bytes.

That is, a disadvantage of the above inter-vehicle communication system is that since the signature data is about 200 bytes in size, it is probably impossible to transmit even 100 bytes of data that are originally intended to be transmitted.

To overcome the disadvantage, the communication system can be improved as follows. The transmitter in the system generates the signature data from the verification data generated from a unit of communication data consisting of M pieces of communication data to be transmitted, and then transmits the communication data together with divided signature data where M pieces of divided signature data are generated by dividing the signature data into M pieces, and are transmitted, attached to M corresponding pieces of communication data. The receiver in the system reconstitutes the unit of communication data from M pieces of received communication data, and reconstitutes the signature data from M pieces of received divided signature data. The communication data can be verified for each unit of communication data with the verification data extracted from the reconstituted signature data.

Conventionally, higher level applications are often installed in the system on the assumption that communication errors often occur. Therefore, even in the presence of data missing, various controls on the reception-side can be continued on the basis of a data-complementing process using previously received communication data or the like.

The data-complementing process, however, cannot be applied to the reconstitution of the verification data when partial data missing occurs. Therefore, in cases where the signature data is transmitted in a divided form as described above, the original signature data (and thus the original verification data) cannot be reconstituted unless a full set of M pieces of received divided signature data are safely received.

Accordingly, when one communication frame is missing on the reception-side, the signature data (and thus the verification data) cannot be reconstituted. As a result, the entire unit of communication data (and thus M pieces of received communication data) becomes impossible to be verified.

In consideration of the foregoing, exemplary embodiments of the present invention are directed to providing a communication system for transmitting and receiving communication data together with signature data attached thereto in a divided form for verifying the communication data, which is capable of verifying the communication data even in the case of partial data missing due to communication errors.

SUMMARY

In accordance with an exemplary aspect of the present invention, there is provided a communication system for transmitting and receiving communication data together with signature data attached thereto for verifying the communication data. A transmission-side terminal of the system generates the signature data for each unit of communication data consisting of M×N (M multiplied by N; M and N are positive integers such that M>=N>=2 where "X>=Y" for integers X, Y means "X is equal to or more than Y") pieces of communication data to be transmitted, divides the generated signature data into M pieces of divided signature data, and repeatedly transmits the M pieces of divided signature data in N rounds, attached to M×N corresponding pieces of communication data.

In the communication system, the M pieces of divided signature data may be attached to M corresponding pieces of communication data that are to be verified by the signature data from which the M pieces of divided signature data are generated.

Alternatively, the M pieces of divided signature data may be attached to M corresponding pieces of communication data that are to be verified by the signature data other than the signature data from which the M pieces of divided signature data are generated. This alternative embodiment may be adapted for a communication system whose communication data should be transmitted and received in real time since the signature data cannot be reconstituted if at least one piece of the M pieces of divided signature data is missing.

On the other hand, a reception-side terminal of the communication system in accordance with the present embodiment receives the communication data together with the divided signature data attached thereto, reconstitutes each unit of to communication data from M×N pieces of received communication data, reconstitutes the signature data for the reconstituted unit of communication data from M pieces of received divided signature data attached to the received communication data, and verifies the reconstituted unit of communication data on the basis of the reconstituted signature data to thereby verify the communication data of the reconstituted unit of communication data. This enables each unit of communication data to be verified by the reconstituted signature data.

In the present communication system, the signature data for verifying the unit of communication data are transmitted not in a non-divided form (see FIG. 9A), but in a divided form (see FIG. 9B) such that the M pieces of divided signature data are repeatedly transmitted in N rounds, attached to M×N corresponding pieces of communication data. This can prevent significant increase in data amount of additional data in each communication frame for verifying the communication data.

Consequently, it becomes possible to implement the electronic signature scheme without significantly reducing throughput of the communication data, which enables both the throughput and the security level required for the communication system to be assured.

In the present communication system, since the M pieces of divided signature data are repeatedly transmitted in N rounds, the reception-side terminal can reliably reconstitute the signature data unless at least one piece of divided signature data fails to be received in all the N rounds.

BRIEF DESCRIPTION OF THE DRAWINGS

In the accompanying drawings:

FIG. 4 schematically illustrates a flowchart of a transmitting process in accordance with the first embodiment;

FIG. 5 schematically illustrates communication frames to be generated in the transmitting process;

DESCRIPTION OF SPECIFIC EMBODIMENTS

The present invention will be described more fully hereinafter with reference to the accompanying drawings. Like numbers refer to like elements throughout.

First Embodiment

Figure 1:
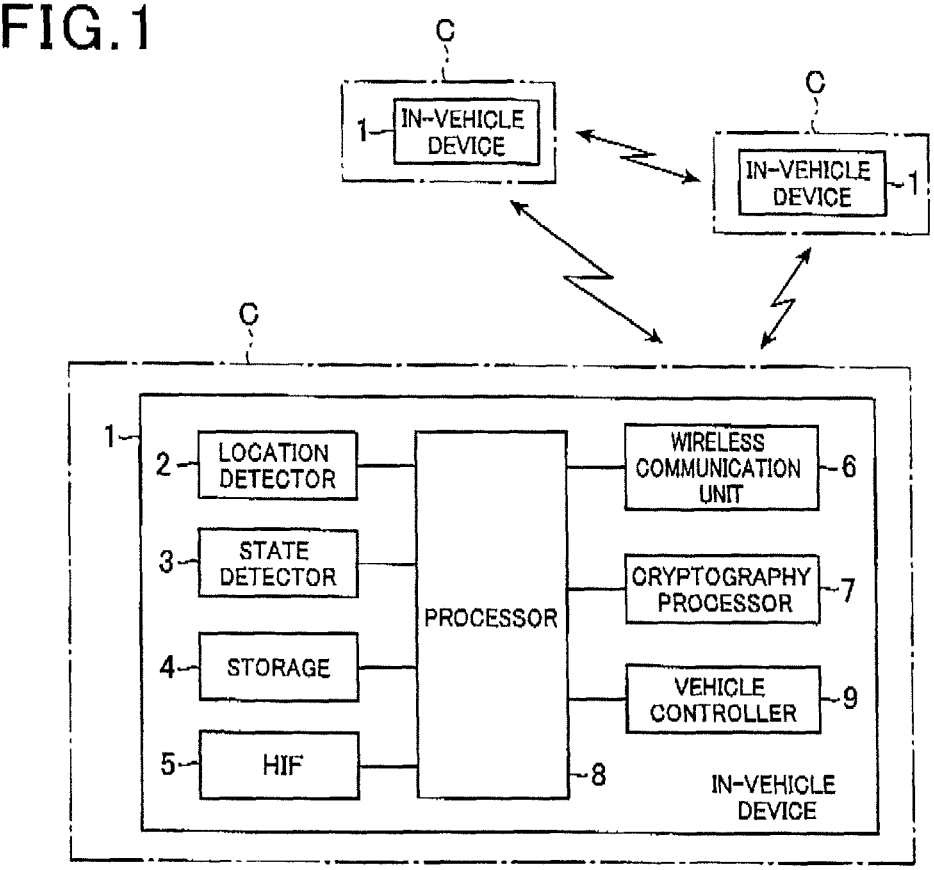
FIG. 1 schematically illustrates a block diagram of a communication system including an in-vehicle device in accordance with a first embodiment of the present invention.

FIG. 1 shows a block diagram of a communication system including an in-vehicle device in accordance with the first embodiment of the present invention.

As shown in FIG. 1, the communication system of the present embodiment includes a plurality of in-vehicle devices 1 each mounted in a corresponding vehicle C that can wirelessly communicate with each other.

The in-vehicle device 1 of one's own vehicle C exchanges vehicle information of the own vehicle, such as a location, a velocity, an acceleration, an angular velocity, correction information for the location, with other in-vehicle devices 1 of peripheral vehicles C around the own vehicle (e.g., within an area of 200 m radius centered at the own vehicle) through inter-vehicle communications to thereby avoid collisions with the peripheral vehicles.

(Communication Frame)

There will now be explained a communication frame to be transmitted and received In the communication system of the present embodiment with reference to FIG. 2.

Figure 2:
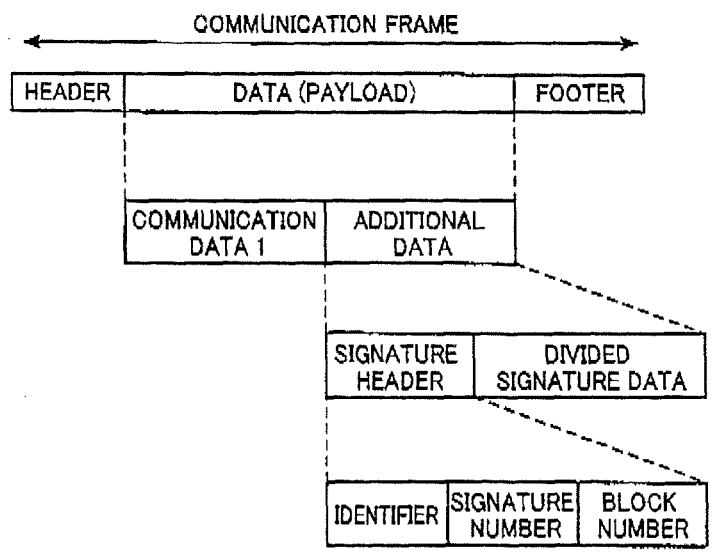
FIG. 2 schematically illustrates a communication frame for use in the communication system.

Each communication frame, as shown in FIG. 2, includes a header, a data portion (payload), a footer. The header and footer are known, and are defined according to a specific communication protocol for use in the communication system. The header includes at least information for identifying a source of the communication frame. The footer includes at least an error detection code, such as a CRC code.

The data portion includes communication data composed of the vehicle information, and additional data used to verify the communication data.

For each frame, the additional data includes a signature header and a piece of divided signature data. M (a positive integer such that M≥2) pieces of divided signature data are obtained by dividing the signature data into M pieces where the signature data is generated for each unit of communication data consisting of M×N (both positive integers such that M, N≥2) pieces of communication data. This signature header includes information used for reconstituting the original signature data from the M pieces of divided signature data.

The signature header includes an identifier for identifying a type of signature object (e.g., certificate, data), a signature number k (k=1, 2, . . . ) for identifying which signature data the present divided signature data belongs to, and a block number i (i=1, 2, . . . , M) for indicating where is the present divided signature data in the signature data identified by the signature number k in ascending order.

(In-Vehicle Device)

Referring back to FIG. 1, the in-vehicle device 1 includes a location detector 2 that detects a current location of one's own vehicle, a state detector 3 that detects a vehicle state of the own vehicle by means of various sensors included in the detector 3, such as a velocity sensor, an acceleration sensor, an angular velocity sensor, a storage 4 that stores various information including at least map information, and a human interface (HIF) 5 that includes, for example, a control panel for inputting various instructions from a user, a display for displaying a map and various information, and a speaker for generating a guidance voice or an audible alarm.

The in-vehicle device 1 further includes a wireless communication unit 6 for wirelessly communicating with the other vehicles, a cryptography processor 7 for generating the signature data to verify the communication data to be transmitted via the wireless communication unit 6 and for performing a verifying process to verify the communication data received via the wireless communication unit 6, and a processor 8 for performing various processes using the units 2-7, and a vehicle controller 9 for performing various vehicle controlling processes, such as brake control, according to instructions from the processor 8.

The location detector 2 detects a current location, a current travelling direction and the like of one's own vehicle on the basis of radio waves received from the GPS satellites. Complementarily to the GPS navigation, the location detector 2 also detects the current location, in the so-called autonomous navigation, on the basis of a travelling distance derived from the acceleration, the angular velocity and the like detected by the state detector 3, and a travelling direction derived from outputs of a geomagnetic sensor. It should be noted that the GPS navigation and the autonomous navigation are complementary to each other.

The wireless communication unit 6 broadcasts a communication frame as shown in FIG. 2 to in-vehicle devices 1 of other vehicles C. Specifically, upon reception of data from the processor 8, the wireless communication unit 6 generates and then transmits the communication frame including the data (payload) from the processor 8 and the header and footer attached to the data. On the other hand, upon reception of the communication frame from other in-vehicle devices, the wireless communication unit 6 checks whether or not there exists a communication error on the basis of information included in the header and footer (e.g., a known CRC code), discards the received frame in the presence of the communication error, and notifies the processor 8 of the reception of the frame in the absence of the communication error.

The cryptography processor 7 generates signature data including a public key, an electronic certificate for verifying the public key and encrypted data obtained by encrypting verification data (e.g., a message digest generated by a hash function) generated from the communication data to be transmitted with a private key, and further performs first and second verifying processes. In the first verifying process, the cryptography processor 7 verifies the public key by using the electronic certificate. In the second verifying process, the cryptography processor 7 verifies the communication data (i.e., checks whether or not the communication data has been tampered with) by comparing verification data obtained by decrypting the encrypted data with the public key that has been verified to be valid in the first verifying process with verification data extracted from the received communication data The processor 8 may be a known microcomputer including a CPU, a ROM, a RAM, and performs as a navigation device, according to instructions inputted via the HIF 5, a navigation-related process for setting or establishing a traveling path and then displaying or guiding the set traveling path, using a current location detected by the location detector 2 of the own vehicle and map information stored in the storage 4. In addition, the processor 8 performs a transmitting process for transmitting the vehicle information of the own vehicle (hereinafter, referred to as "own-vehicle information") via the wireless communication unit 6 and a receiving process for receiving the vehicle information of the other vehicles (hereinafter, referred to as "other-vehicle information") via the wireless communication unit 6, and then estimating a degree of a collision risk with the other vehicles on the basis of the own-vehicle information and the other-vehicle information.

The navigation-related process includes a location information correcting (map-matching) process where the processor 8 acquires location information from the location detector 2 regularly or periodically, compares the acquired information with the map information stored in the storage 4, and then corrects the location information such that the own vehicle is positioned on a road of the map.

Figure 3:
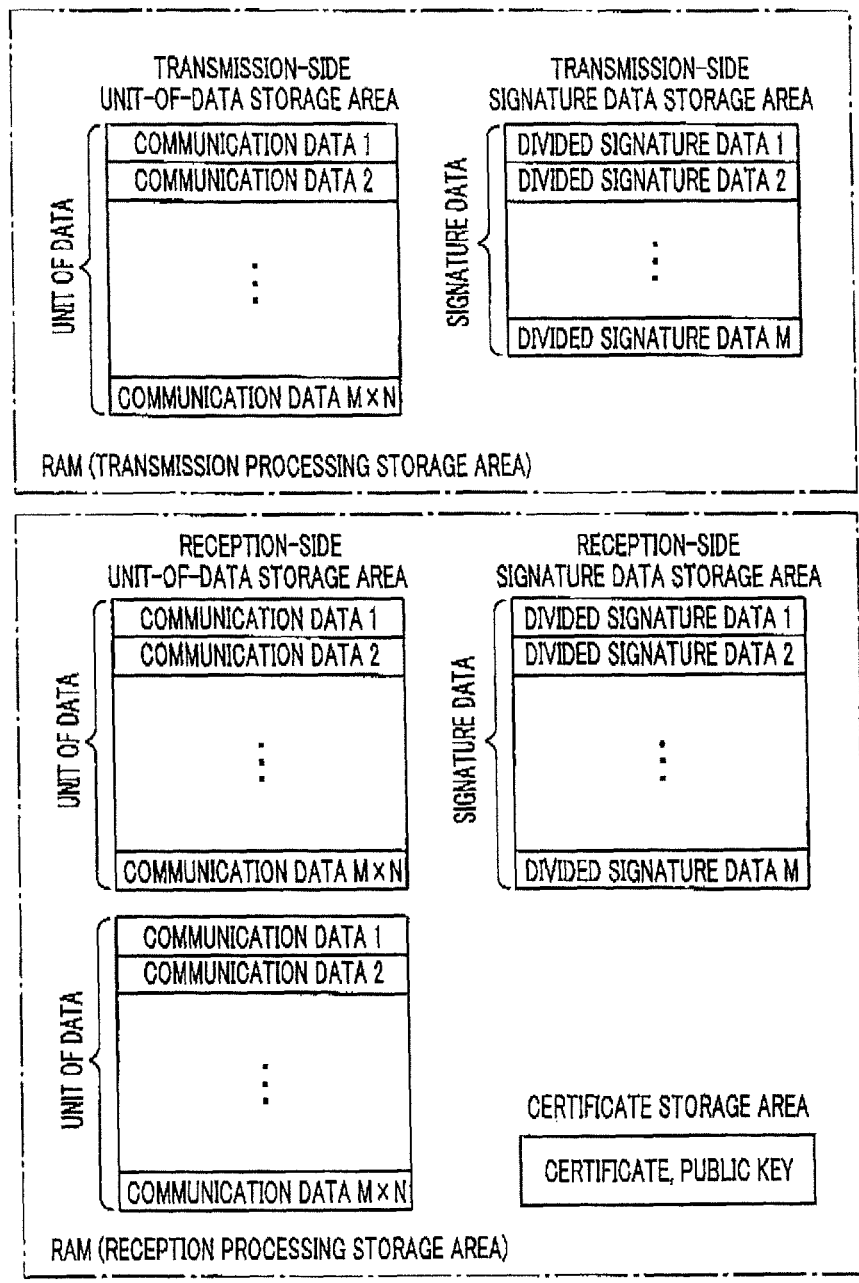
FIG. 3 schematically illustrates storage areas for various kinds of data.

As shown in FIG. 3, the RAM of the processor 8 has a transmission processing storage area and a reception processing storage area(s) reserved therein.

The transmission processing storage area includes a transmission-side unit of communication data storage area for storing a unit of communication data consisting of M×N pieces of communication data to be transmitted, and a transmission-side signature data storage area for storing the signature data generated by the cryptography processor 7 for the unit of communication data. The transmission-side signature data storage area has M blocks for successively storing M pieces of divided signature data.

That is, the transmission-side unit of communication data storage area includes M×N blocks for successively storing M×N pieces of communication data where the M×N pieces of communication data forms one unit of communication data, and the transmission-side signature data storage area includes M blocks for successively storing M pieces of divided signature data where the M pieces of divided signature data forms one piece of signature data generated for the unit of communication data.

The wireless communication unit 6 reserves in the RAM one reception processing storage area for each of a maximum number of concurrent communication partners (hereinafter, referred to as an "allowable communication number"). Each reception processing storage area includes two reception-side unit of communication data storage areas each similar to the transmission-side unit of communication data storage area, one reception-side signature data storage area similar to the transmission-side signature data storage area, and a certificate storage area for storing a public key that has been verified to be valid by the cryptography processor 7 and an electronic certificate for the public key.

(Transmitting Process)

There will now be explained a transmitting process performed by the CPU of the processor 8 with reference to a flowchart in FIG. 4.

The transmitting process is repeatedly started at a fixed time interval (in the present embodiment, 100 ms) while the engine is running. Before the first start of the transmitting process, the parameters i, j for use in the process shall be initialized to 1.

Each time the process is started, the processor 8 acquires the vehicle information (in the present exemplary embodiment, a location, a velocity, an acceleration, an angular velocity, and correction information of the own vehicle) from the location detector 2 and the state detector 3, generates communication data from the vehicle information, and then stores the generated communication data in the $((j-1) \times M+i)$-th block of the transmission-side unit of communication data storage area at step S110.

Subsequently, at step S120, it is determined by the processor 8 whether or not signature data for transmission is stored in the transmission-side signature data storage area.

If the signature data is not stored in the transmission-side signature data storage area, the process proceeds to step S130, where the communication data acquired at step S110 will be transmitted together with dummy data (that is prepared in advance) attached thereto via the wireless communication unit 6. The process proceeds to step S150. Since M×N pieces of communication data are required to generate the signature data, there is no signature data for transmission stored (or there are dummy data stored) in the transmission-side signature data storage area during a time period from the first start to the M×N-th start of the transmission process (i.e., during a time period T0-T1).

If the signature data is stored in the transmission-side signature data storage area, the process proceeds to step S140, where the communication data acquired at step S110 and the additional data generated from the divided signature data stored in the i-th block in the transmission-side signature data storage area will be transmitted via the wireless communication unit 6. The process then proceeds to step S150.

Since the communication frame is to be transmitted immediately after the steps S130, S140 for each transmitting process, the communication frame transmission cycle substantially coincides with the start cycle of the process.

At step S150, the parameter i is incremented ($k \leftarrow i+1$). Then at step S160, it is determined whether or not the parameter i is larger than M where M is a division number of the signature data. If the parameter i is equal to or less than M, it is determined that a full set of M pieces of communication data required for generating signature data have not been prepared yet, and then the process is immediately ended.

If the parameter i is larger than M, the parameter i is initialized to 1 at step S170. Subsequently, at step S180, the parameter j is incremented ($j \leftarrow j+1$), which is followed by step S190.

At step S190, it is determined whether or not the parameter j is larger than N where N is a repetition number. If the parameter j is equal to or less than N, it is determined that a full set of M×N pieces of communication data required for generating signature data have not been prepared yet, and then the process is immediately ended.

If the parameter j is larger than N, it can be considered that a full set of M×N pieces of communication data required to generate signature data has been prepared, which is followed by step S200, where the parameter j is initialized to 1. The process then proceeds to step S210.

At step S210, the signature data is generated by the cryptography processor 7 under the control of the processor 8 for a unit of communication data consisting of M×N pieces of communication data stored in the transmission-side unit of communication data storage area. After the generated signature data is stored in the transmission-side signature data storage area, the process is ended.

(Operations in the Transmitting Process)

FIG. 5 schematically illustrates communication frames to be transmitted in each transmitting process, where the repetition number N is set, for example, to 2.

As shown in FIG. 5, when the transmitting process is first started (T0), no signature data is stored in the transmission-side signature data storage area. Therefore, dummy data will be attached to the first to 2M-th communication frames (communication data 1-2M in FIG. 5) until the first signature data 1 is generated (T0-T1).

After the transmission of the 2M-th communication frame (T1), the signature data 1 is generated for the 2M pieces of communication data 1 to 2M forming one unit of communication data. The generated signature data 1 for the unit of communication data is stored in the transmission-side signature data storage area in a divided form. Accordingly, M pieces of divided signature data 1-1 to 1-M obtained by dividing the signature data 1 into M pieces will be successively and cyclically attached to the (2M+1)-th to the 4M-th communication frames (communication data 2M+1 to 4M) until the subsequent signature data 2 is generated (T1-T2). For example, the communication data 2M+1 to 3M are successively transmitted together with the divided signature data 1-1 to 1-M and the communication data 3M+1 to 4M are also successively transmitted together with the same divided signature data 1-1 to 1-M. In this way, the attachment of the divided signature data to the communication data is repeated twice (N=2 times).

Similarly, in subsequent transmitting processes, M pieces of divided signature data k-1 to k-M, which are obtained by dividing the signature data k into M pieces, will be successively and cyclically transmitted, attached to (2 k·M+1)-th to 2(k+1)·M-th communication frames (k32 0, 1, 2, . . . ), in N=2 rounds.

(Receiving Process)

Figure 6:
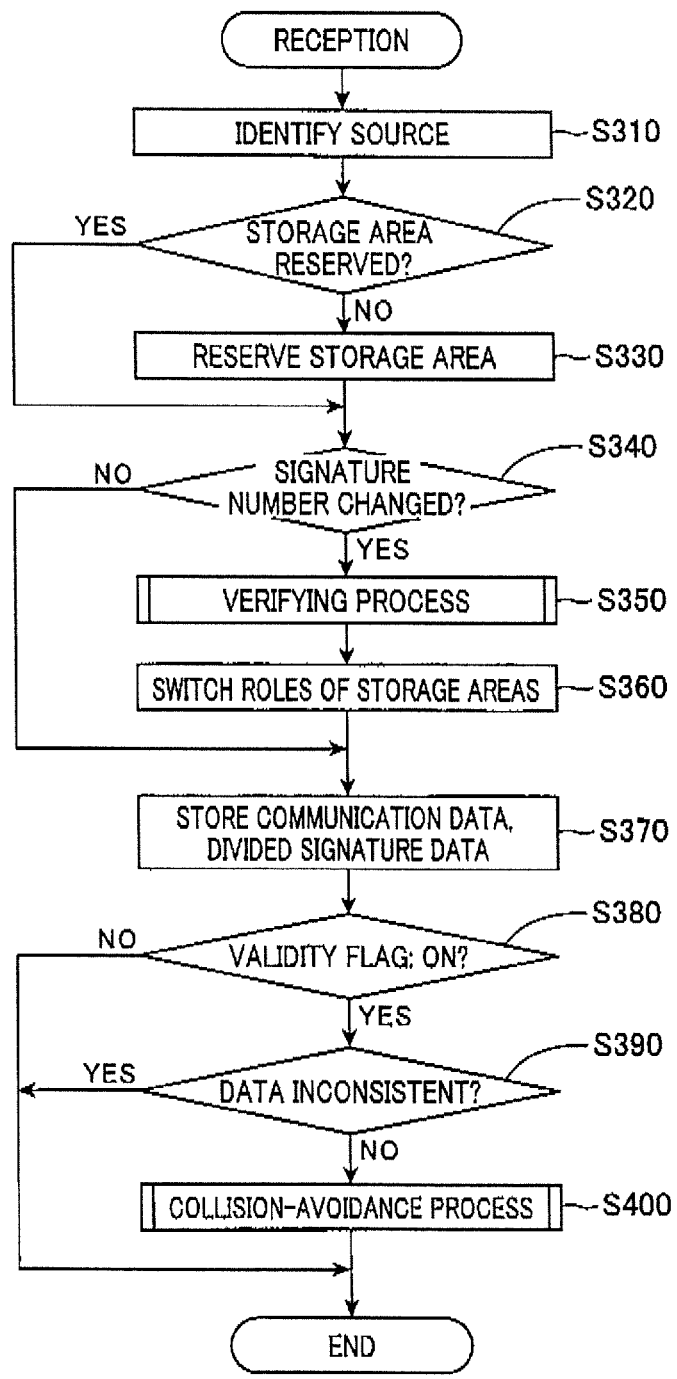
FIG. 6 schematically illustrates a flowchart of a receiving process in accordance with the first embodiment.

There will now be explained a receiving process performed by the CPU of the processor 8 with reference to a flowchart in FIG. 6.

The process is started each time the communication frame is received by the in-vehicle device 1 while the vehicle engine is running. A validity flag, which indicates whether or not the received communication data has been verified to be valid with the signature data, is used in the process, and the flag is set to ON/OFF in the verifying process which will be described later. Before the receiving process is started for the first time, the validity flag shall be set to OFF (unverified).

Once the process is started, the processor 8 identifies a source of the received communication frame from the header at step S310, and then at step S320 determines whether or not the reception processing storage area has been reserved for the identified source (hereinafter, referred to as a "communication partner").

If the reception processing storage area has not been yet reserved for the identified source, the reception processing storage area is reserved for the identified source at step S330, and one of the two reception-side unit of communication data storage areas of the reserved reception processing storage area is selected to store the communication data. Non-selected one of the two reception-side unit of communication data storage areas only keeps data stored therein. If the reception processing storage area has been already reserved for the identified source, the process immediately proceeds to step S340.

In the following, the communication data, the reception-side unit of communication data storage area and the reception-side signature data storage shall here refer to the communication data, the reception-side unit of communication data storage area and the reception-side signature data storage area in the reception processing storage area reserved for the communication partner identified as a source at step S310.

At step 340, it is checked whether or not the signature number included in the header of received additional data has changed from the signature number included in the header of previously received additional data to another number (actually, the previous signature number plus one). If the signature number has changed, then the process proceeds to step S370. If the signature number has not changed, the process immediately proceeds to step S350.

At step 350, the verifying process, which will be described later, is performed using the communication data stored in the non-selected one of the two reception-side unit of communication data storage areas and the signature data stored in the reception-side signature data storage area. Subsequently, at step S360, the non-selected one of the two reception-side unit of communication data storage areas and the reception-side signature data storage area are cleared, and then the roles are switched between the two reception-side unit of communication data storage 1a areas (i.e., the selected one-->the non-selected one, the non-selected one-->the selected one). The process then proceeds to step S370.

At step S370, referring to the block number i in the signature header of the received additional data, the received communication data is stored in the i-th block in the selected one of the two reception-side unit of communication data storage areas, and the received divided signature data in the received additional data attached to the received communication data is stored in the i-th block in the reception-side signature data storage area. If the block number i is larger than M, the received divided signature data is stored in a p-the block in the reception-side signature data storage area where p is a positive integer given by i-(r−1)×M (p, r are positive integers such that 1=<p=<M, 1=<r=<N). In cases where the p-th block has already the divided signature data stored therein, the received divided signature data will be discarded.

Subsequently, at step S380, it is checked whether or not the validity flag is ON where the flag is to be set in the verifying process at step S350. If the flag is OFF, then the process is ended. If the flag is ON, then the process proceeds to step S390.

At step S390, it is checked whether or not the received communication data is consistent. Specifically, it is determined that the received communication data is consistent if a displacement between location information included in the received communication data (in particular, the vehicle information) and location information included in the latest received communication data that has been already verified to be valid with the signature data is within a predetermined, anticipated range. If the displacement is out of the anticipated range, it is determined that the received communication data is inconsistent.

However, if the correction information included in the received communication data (unverified) indicates that the location information has been corrected, it may be considered that the received communication data is consistent even if the displacement is out of the anticipated range. The anticipated range may be variably set according to the vehicle speed of the communication partner and the transmission cycle of the communication frame and the like.

If it is determined that the received communication data is inconsistent, the process is immediately ended. If it is determined that the received communication data is consistent, the process proceeds to step S400, where the processor 8 estimates a risk of collisions with the other vehicles on the basis of the received communication data (in particular, the vehicle information), and then performs on the basis of the estimation a collision-avoiding process to avoid potential collisions in which various controlling operations, such as alarm generation, automatic braking or the like, are performed. The process is then ended.

(Operations in the Receiving Process)

In the receiving process, the received communication data are allowed to be stored in the selected one of the two reception-side unit of communication data storage areas, and the received divided signature data are allowed to be stored in the reception-side signature data storage area.

Each time the signature number is changed, that is, a full set of M×N pieces of communication data have been successfully received and stored without communication errors, the verifying process for verifying the unit of communication data consisting of the M×N pieces of received communication data is performed to thereby verify the communication data.

In the above, M pieces of divided signature data are successively and cyclically transmitted in N rounds. Therefore, even in cases where at least one of the M pieces of divided signature data fails to be received in the first round, the at least one piece of divided signature data will be received in the second or successive rounds unless the at least one piece fails to be received in all the rounds.

As shown in FIG. 5, at the time T1, the unit of communication data B1 (communication data 1 to 2M) have been stored in the selected one of the two reception-side unit of communication data storage areas that is currently selected to store the communication data, while no data is stored in the non-selected one of the two reception-side unit of communication data storage areas. In addition, dummy data are stored in the reception-side signature data storage area. Therefore, since there is no signature data at the time T1, the verifying process cannot be performed.

Subsequently, at the time T2, the unit of communication data 82 (communication data 2M+1 to 4M) have been stored in the selected one of the two reception-side unit of communication data storage areas that is currently selected to store the communication data, and the unit of communication data B1 (communication data 1 to 2M) have been already stored in the currently non-selected one of the two reception-side unit of communication data storage areas. In addition, the signature data 1 (divided signature data 1-1 to 1-M) for the unit of communication data B1 has been stored in the reception-side signature data storage area. Therefore, at the time T2, the verifying process can be performed for the reconstituted unit of communication data B1 by using the reconstituted signature data 1.

For example, even if the divided signature data 1-2 attached to the communication data 2M+2 fails to be received due to communication errors, the divided signature data 1-2 will be received when the divided signature data 1-2 attached to the communication data 3M+2 is successfully received in the second round.

The reception processing storage area may be open to being used to store the communication data from the other vehicles unless the reception processing storage area is accessed to store data by a separate process other than the receiving process during a predetermined maximum time period.

(Verifying Process)

Figure 7:
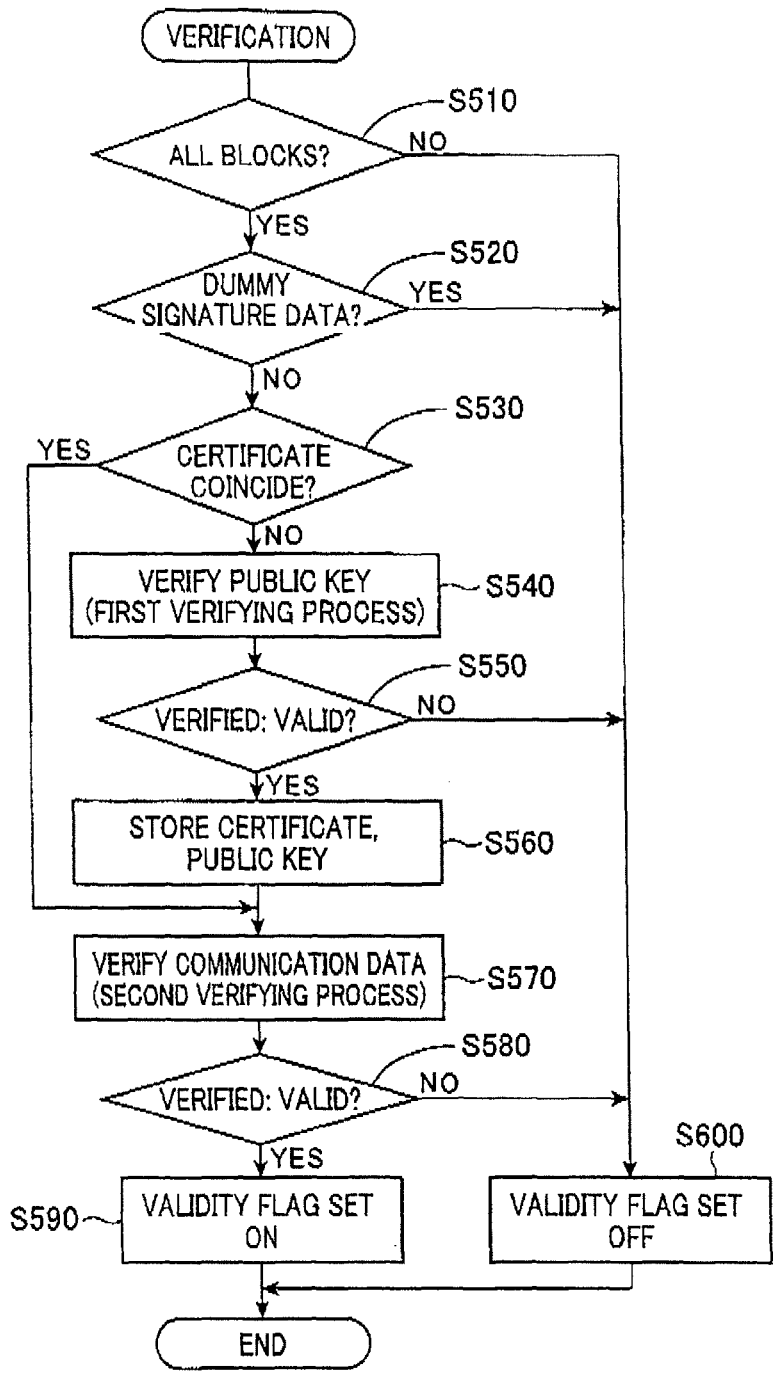
FIG. 7 schematically illustrates a flowchart of a verifying process in accordance with the first embodiment.

There will now be explained the verifying process to be performed at step S350 with reference to a flowchart in FIG. 7.

When the process is started, it is determined at step S510 whether or not all the blocks in the reception-side signature data storage area have corresponding divided signature data stored therein. If at least one block has no divided signature data stored therein, it is determined that the received communication data are impossible to be verified. The process proceeds to step S600, where the validity flag is set to OFF. Then the process is immediately ended.

If all the blocks have corresponding divided signature data stored therein, the process proceeds to step S520, where it is checked whether or not the reconstituted signature data stored in the reception-side signature data storage area is dummy data. If the reconstituted signature data stored in the reception-side signature data storage area is dummy data, then the process proceeds to step S600, where the validity flag is set to OFF. Then the process is immediately ended.

If the reconstituted signature data is not dummy data, the process proceeds to step S530, where it is determined whether or not the electronic certificate extracted from the reconstituted signature data coincides with the electronic certificate that is stored in the certificate storage area. If the electronic certificate from the reconstituted signature data coincides with the electronic certificate from the certificate storage area, the subsequent operation at step S570 is performed using the public key stored in the certificate storage area together with the electronic certificate for the public key.

If it is determined at step S530 that the electronic certificate extracted from the reconstituted signature data doesn't coincide with the electronic certificate that is stored in the certificate storage area, the process proceeds to step S540, where the first verifying process for verifying the public key extracted from the reconstituted signature data is performed by the cryptography processor 7 using the electronic certificate extracted from the reconstituted signature data.

Subsequently at step S550, if the public key fails to be verified in the first verifying process by the cryptography processor 7, the process proceeds to step S600, where the validity flag is set to OFF. The process is then ended.

On the other hand, if the public key is successfully verified to be valid at step S550, the process proceeds to step S560, where the electronic certificate and the verified public key both extracted from the reconstituted signature data are stored in the certificate storage area. The process then proceeds to step S570.

At step S570, the second verifying process for verifying the received communication data is performed by the cryptography processor 7, where the encrypted data extracted from the reconstituted signature data is decrypted using the public key verified to be valid in the first verifying process, and then the reconstituted verification data (e.g., the message digest) obtained by decrypting the encrypted data is compared with the verification data generated from the received communication data (actually, the unit of communication data).

Subsequently at step S580, if the communication data is successfully verified to be valid in the second verifying process by the cryptography processor 7, the validity flag is set to ON at step S590. The process is then ended. If the communication data is fails to be verified, the validity flag is set to OFF at step S600. The process is then ended.

Referring to FIG. 5, for example, if the communication data 1 to 2M are not verified to be valid at the time T2, the validity flag will remain OFF before the time T3 is reached. Therefore, the communication data 4M+1 to 6M will not be used in the collision-avoiding process (S400). If the communication data 2M+1 to 4M are verified to be valid at the time T3, the communication data 6M+1 to 8M received during a time period T3-T4 may be regarded as valid data provided that the communication data 6M+1 to 8M are consistent with the latest verified communication data 4M. Therefore, the communication data 6M+1 to 8M may be used in the collision-avoiding process (S400).

As described above, in the communication system in accordance with the above embodiment, the in-vehicle device 1 on the transmission side generates signature data for each unit of communication data consisting of M×N pieces of communication data to be transmitted, divides the generated signature data into M pieces of divided signature data, and successively and cyclically transmits the M pieces of divided signature data in N rounds, attached to successive pieces of communication data.

On the other hand, the in-vehicle device 1 on the reception side reconstitutes each unit of communication data from M×N pieces of received communication data, reconstitutes the signature data for the reconstituted unit of communication data from M pieces of received divided signature data (each extracted from received additional data), and verifies the reconstituted unit of communication data on the basis of the reconstituted signature data to thereby verify the communication data of the reconstituted unit of communication data.

In this way, in the communication system in accordance with the above embodiment, the signature data for verifying the unit of communication data are transmitted not in a non-divided form, but in a divided form where the signature data is divided into M pieces to be transmitted, attached to the communication data. This can prevent significant increase in data amount of additional data in each communication frame for verifying the communication data.

Consequently, it becomes possible to implement the electronic signature scheme without significantly reducing throughput of the communication data, which enables both the throughput and the security level required for the communication system to be assured.

In the communication system in accordance with the above embodiment, since the M pieces of divided signature data are successively and cyclically transmitted in N rounds, the reception-side in-vehicle device 1 can reliably reconstitute the signature data unless at least one piece of divided signature data fails to be received in ail the N rounds.

Therefore, even in cases where partial data missing occurs due to communication errors, the communication data can be verified.

In addition, the reception-side in-vehicle device 1 determines that the received communication data that is unverified with the reconstituted signature data is consistent if a displacement between location information included in the unverified communication data and location information included in the latest verified (to be valid) communication data is within a predetermined, anticipated range. If the unverified communication data is consistent, then the reception-side in-vehicle device 1 is allowed to use the unverified communication data in the collision-avoiding process.

Therefore, the in-vehicle device 1 of the present embodiment can control itself in real time on the basis of the unverified non-abnormal communication data.

In addition, in the in-vehicle device 1 of the present embodiment, if the correction information indicates that the location information has been corrected, then it may be considered that the communication data is consistent even if the displacement is out of the anticipated range. This enables actually normal received communication data to be exploited without being unnecessarily discarded as abnormal.

At the time when communication with the in-vehicle device 1 of the communication partner is started, the own vehicle is substantially spaced apart from the vehicle of the communication partner with a certain distance (approximately, a radius of the coverage area of the wireless communication unit 6, e.g., around 200 m). Therefore, even after a time period from the start of reception of communication data from the communication partner's vehicle to the completion of the first verification of received communication data has elapsed after the start of reception, a risk of collision between the own vehicle and the communication partner's vehicle remains low.

Second Embodiment

There will now be explained a communication system of a second embodiment. For brevity, only differences from the first embodiment will be explained.

(Transmitting Process)

Figure 9A:
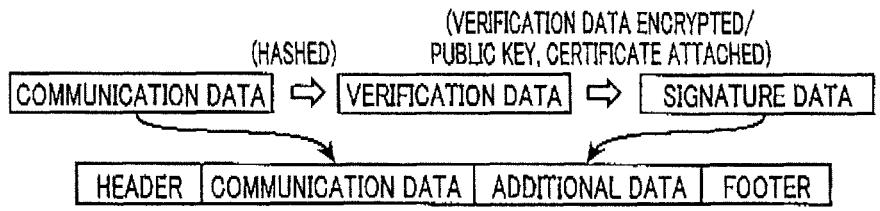
FIG. 9A schematically illustrates a relation between verification data and additional data in a conventional communication system.
Figure 9B:
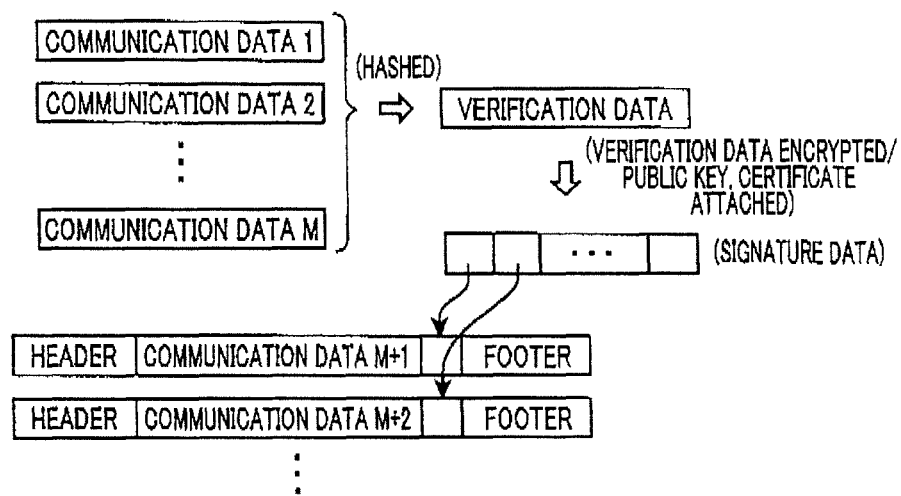
FIG. 9B schematically illustrates a relation between verification data and additional data in the communication system in accordance with the first embodiment.
Figure 9C:
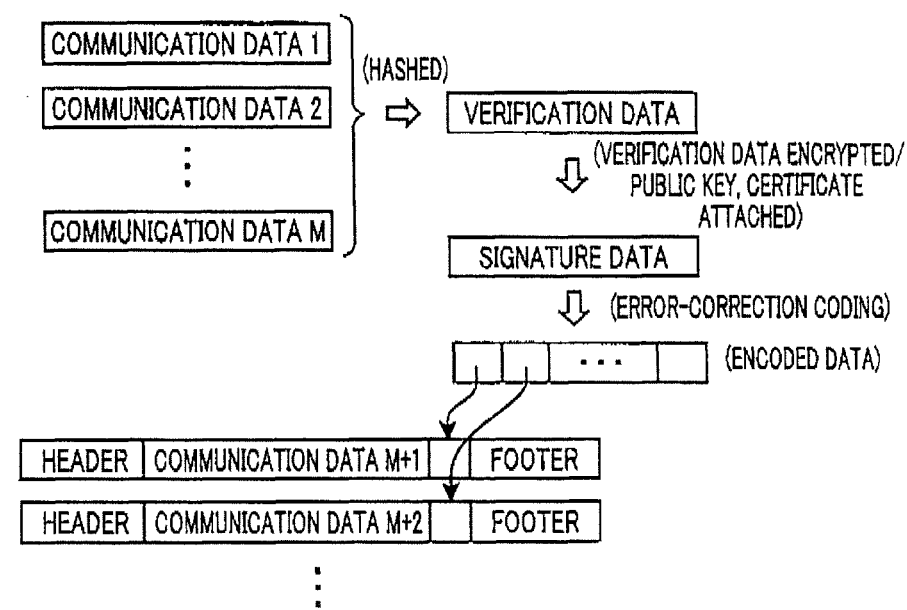
FIG. 9C schematically illustrates a relation between verification data and additional data in the communication system in accordance with the second embodiment.

Referring back to FIG. 4, at step S210, the signature data is generated by the cryptography processor 7 for a unit of communication data consisting of M×N pieces of communication data stored in the transmission-side unit of communication data storage area. Subsequently, as shown in FIG. 9C, the generated signature data is encoded by using block-error-correction coding, and then the encoded data is stored in the transmission-side signature data storage area.

In the present embodiment, the encoded data is divided into M pieces of divided signature data before being stored in the transmission-side signature data storage area in a similar manner as described above.

The block-error-correction coding may include, but are not limited to, Reed-Solomon coding. In addition, it can be assumed here that in cases where only one piece of divided signature data is missing, the signature data can be restored on the reception side.

(Receiving Process)

Figure 8:
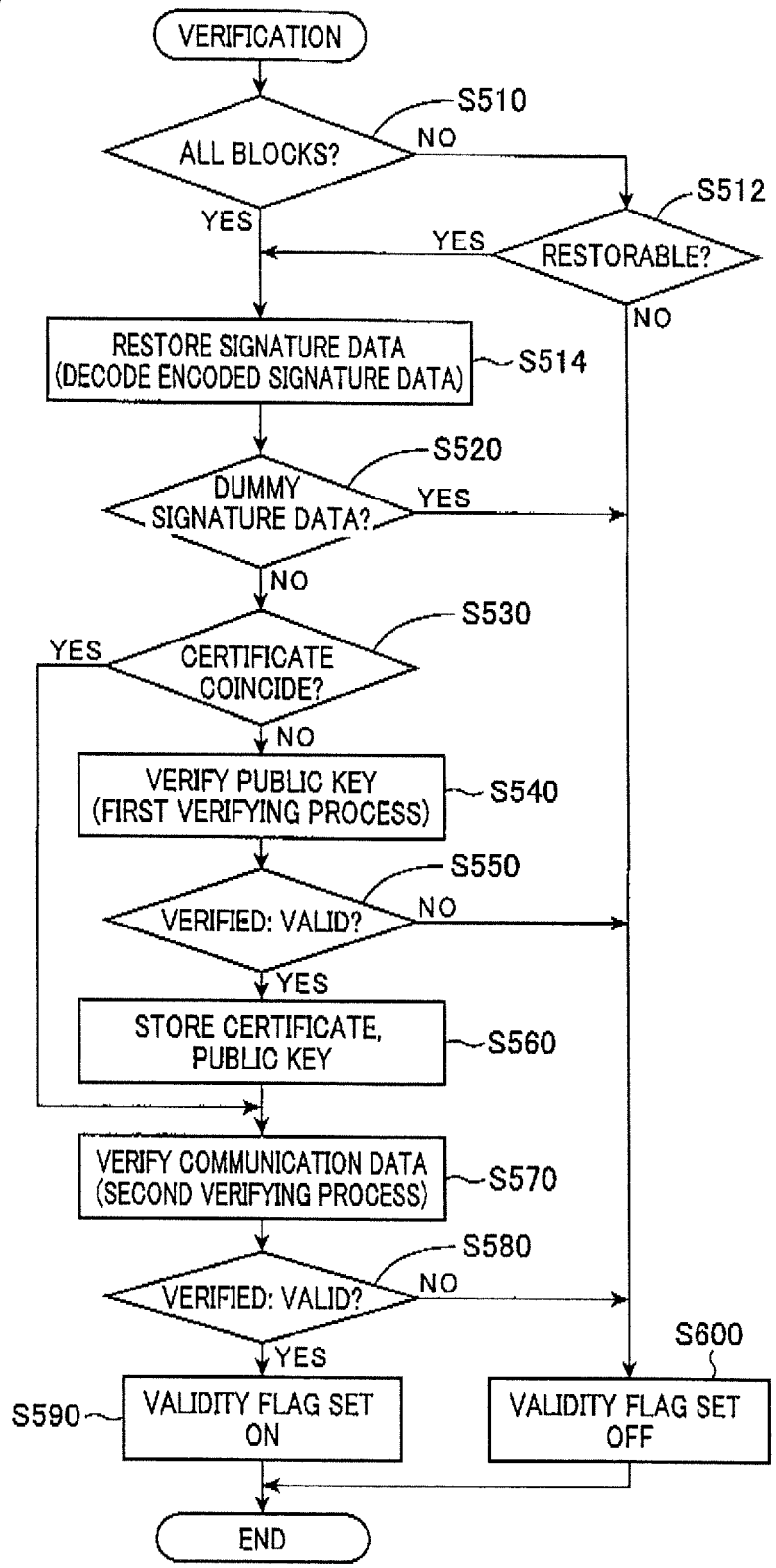
FIG. 8 schematically illustrates a flowchart of a verifying process in accordance with a second embodiment of the present invention.

There will now be explained a receiving process, in particular, a verifying process, with reference to a flowchart in FIG. 8. Like numbers refer to like steps throughout in the drawings.

It is determined at step S510 whether or not all the blocks in the reception-side signature data storage area have the divided signature data stored therein. If at least one block has no divided signature data stored therein, then it is determined at step S512 whether or not it is possible to restore the signature data by using error-correction decoding (e.g., Reed-Solomon decoding). If not possible, then the validity flag is set to OFF at step S600. The process is then ended.

Specifically, at step S512, in cases where only one block of divided signature data is missing, it is determined that the signature data can be restored (from the assumption). However, in cases where more than one block of divided signature data are missing, it is determined that the signature data cannot be restored.

If is determined at step S510 that all the blocks have corresponding divided signature data stored therein, or if it is determined at step S512 that the signature data can be restored, then at step S514 the encoded data (M or M-1 pieces of divided signature data) stored in the reception-side signature data storage area are decoded to restore and reconstitute the original signature data. The process proceeds to step S520.

Operations in the subsequent steps S520 to S600 are similar to those of the first embodiment.

In the communication system of the present embodiment, even in cases where some pieces of divided signature data are missing, the signature data can be restored provided that the number of missing pieces of divided signature data is within an allowable number (e.g., one in the present embodiment), and thus can be reconstituted to verify the received communication data with the reconstituted signature data.

In the present embodiment, it has been assumed that the repetition number N is equal to or more than 2. Alternatively, the repetition number N may be set to 1.

Third Embodiment

There will now be explained a communication system of a third embodiment. Also, only differences from the first and second embodiments will be explained. For simplicity, in the following, the vision number N is assumed to be 1.

Figure 10A:
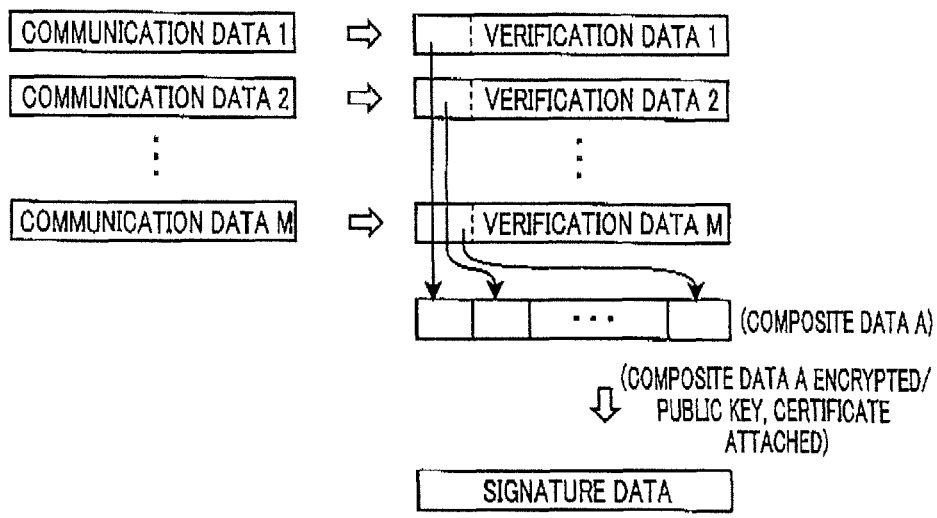
FIG. 10A schematically illustrates a generating process of the signature data in accordance with a third embodiment of the present invention.
Figure 10B:
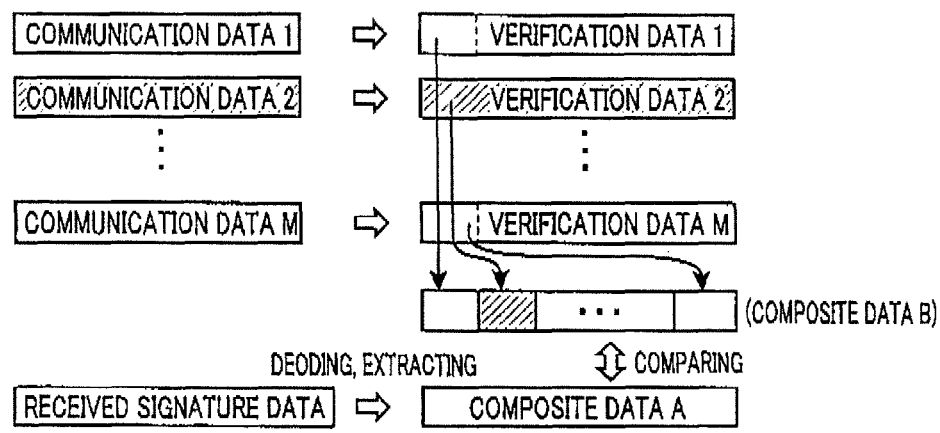
FIG. 10B schematically illustrates a verifying process in accordance with the third embodiment.
Figure 11:
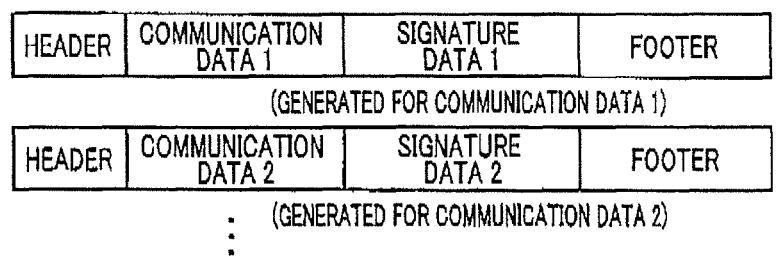
FIG. 11 schematically illustrates a communication frame for use in a conventional communication system.

FIG. 10A and FIG. 10B show a generating process of the signature data and a verifying process of the communication data, respectively.

On the transmission side, as shown in FIG. 10A, the signature data is generated for each unit of communication data consisting of M pieces of communication data as follows.

For each unit of communication data of consisting of M pieces of communication data to be transmitted, M pieces of verification data (e.g., M message digests each generated by a hash function) are generated, and then composite data A is generated by catenating M pieces of partial verification data (i.e., partial data of verification data). Subsequently, the composite data A is encrypted, and then the signature data is generated by attaching a public key, an electronic certificate for the public key to the encrypted data (encrypted composite data A).

As in the second embodiment, the signature data is encoded by the block-error-correction coding, the encoded data is divided into M pieces of divided signature data, which will each be included in additional data attached to the communication data to be transmitted in a communication frame.

On the reception-side of the communication frame, as shown in FIG. 10B, the signature data is extracted from the received communication frames (as in the second embodiment), and then the encrypted data is extracted from the signature data. The composite data A is obtained by decrypting the encrypted data with the public key. In parallel with these operations, verification data are generated from the received communication data, and then composite data B is generated from the M pieces of received communication data by catenating M pieces of partial verification data in a similar manner as described above.

Subsequently, it is determined whether or not the composite data A, B coincide with each other by comparing each piece of partial verification data of the composite data A with a corresponding piece of partial verification data of the composite data B. If the composite data A, B coincide with each other, all the pieces of received communication data are verified to be valid.

In cases where some pieces of divided signature data are missing due to communication errors, the signature data can be restored provided that the number of missing pieces of divided signature data is equal to or less than an allowable number (e.g., one in the present embodiment), and thus the composite data A can be restored. Regarding the communication data, however, the unit of communication data cannot be restored due to some pieces of received communication data being still missing. Therefore, some pieces of partial verification data of the composite data B, which are corresponding to missing pieces of received communication data, remain missing (see shaded blocks in FIG. 106).

In this case, if the remaining pieces of partial verification data for the composite data B each coincide with a corresponding piece of partial verification data for the composite data A, then it is determined that some pieces of communication data corresponding to the remaining pieces of partial verification data for the composite data B are verified to be valid.

As described above, in the communication system of the present embodiment, even in cases where some pieces of the M pieces of communication data forming a unit of communication data for which the signature data is generated are missing, the remaining pieces of communication data can be verified to be valid without any difficulties, which enables the remaining pieces of received communication data to be exploited without being unnecessarily discarded.

The above descriptions on the third embodiment are based on the communication system of the second embodiment where the signature data is encoded by the error-correction coding. Alternatively, the third embodiment, however, may be arranged based on the communication system of the first embodiment where M pieces of divided signature data are successively and cyclically transmitted in $N(>=2)$ rounds.

Other Embodiments

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

In the embodiments disclosed above, the cryptography processor 7 is adapted to perform the first verifying process (S540) and the second verifying process (S570). Alternatively, the cryptography processor 7 may be adapted to perform all the verifying processes.

In the embodiments disclosed above, the in-vehicle device 1 serves as a transceiver. Alternatively, the in-vehicle device 1 may serve as either one of a transmitter and a receiver.

In the embodiments disclosed above, the inter-vehicle communication system has been described. However, the invention is applicable to any communication system that attaches additional data for verifying the communication data to the communication data, and transmits and receives the communication data together with the additional data attached thereto.

What is claimed is:

1. A communication system for transmitting and receiving communication data together with signature data attached thereto for verifying the communication data, the system comprising:
   a transmission-side terminal that, each time M×N (M, N are positive integers such that M≥2 and N≥2 i.e., M and N are equal to or greater than 2) pieces of communication data constituting one unit of communication data are transmitted, generates the signature data for the one unit of communication data consisting of M×N pieces of communication data last transmitted, divides the generated signature data into M pieces of divided signature data, and then sequentially transmits the M pieces of divided signature data repeatedly in N rounds, cyclically attached to M×N corresponding pieces of communication data, wherein each of the M pieces of divided signature data is a transmitted in each round, attached to a corresponding piece of communication data, each time the corresponding piece of the communication data is generated; and
   a reception-side terminal that, each time the M×N pieces of communication data constituting the one unit of communication data are received from the transmission-side terminal, reconstitutes the one unit of communication data from the M×N pieces of communication data received previous to the M×N pieces of communication data constituting the one unit of communication data last received, reconstitutes the signature data from the M pieces of divided signature data cyclically attached to the M×N corresponding pieces of communication data constituting the one unit of communication data last received, and verifies the reconstituted one unit of communication data by using the reconstituted signature data.

2. The system of claim 1, wherein
   the transmission-side terminal generates verification data for collectively verifying the one unit of communication data, and generates the signature data using the verification data; and
   reception-side terminal verifies the reconstituted one unit of communication data by comparing the verification data generated from the reconstituted one unit of communication data and the verification data extracted from the reconstituted signature data.

3. A transmitter for use in a communication system for transmitting and receiving communication data together with signature data attached thereto for verifying the communication data,
   the transmitter comprising:
   signature-data generating means for, each time M×N (M, N are positive integers such that M≥2 and N≥2 i.e., M and N are equal to or greater than 2) pieces of communication data constituting one unit of communication data are transmitted, generating the signature data for the one unit of communication data consisting of M×N pieces of communication data last transmitted;
   signature-data dividing means for dividing the generated signature data into M pieces of divided signature data; and
   transmitting means for transmitting the M pieces of divided signature data repeatedly in N rounds, cyclically attached to M×N corresponding pieces of communication data, such that each of the M pieces of divided signature data is transmitted in each round, attached to a corresponding piece of communication data, each time the corresponding piece of the communication data is generated.

4. A receiver for use in a communication system for transmitting and receiving communication data together with signature data attached thereto for verifying the communication data, wherein, each time M×N (M, N are positive integers such that M≥2 and N≥2 i.e., M and N are equal to or greater than 2) pieces of communication data constituting one unit of communication data are transmitted, the signature data is generated for the one unit of communication data consisting of M×N pieces of communication data last-transmitted, and is divided into M pieces of divided signature data, and the M pieces of divided signature data are transmitted repeatedly in N rounds, cyclically attached to M×N corresponding pieces of communication data, wherein each of the M pieces of the divided signature data is transmitted in each round, attached to a corresponding piece of communication data, each time the corresponding piece of the communication data is generated, the receiver comprising:
  receiving means for receiving the communication data together with the divided signature data attached thereto;
  communication data reconstituting means for, each time M×N pieces of communication data constituting the one unit of communication data are received, reconstituting the one unit of communication data from the M×N pieces of communication data received previous to the M×N pieces of communication data constituting the one unit of communication data last received;
  signature data reconstituting means for reconstituting the signature data from the M pieces of divided signature data cyclically attached to the M×N corresponding pieces of communication data constituting the one unit of communication data last received; and
  verifying means for verifying the reconstituted one unit of communication data by using the reconstituted signature data.

5. A transceiver for use in a communication system for transmitting and receiving communication data together with signature data attached thereto for verifying the communication data, the transceiver comprising:
  signature-data generating means for, each time M×N (M, N are positive integers such that M≥2 and N≥2 i.e., M and N are equal to or greater than 2) pieces of communication data constituting one unit of communication data are transmitted, generating the signature data for the one unit of communication data consisting of M×N pieces of communication data last transmitted;
  signature-data dividing means for dividing the generated signature data into M pieces of divided signature data; and
  transmitting means for transmitting the M pieces of divided signature data repeatedly in N rounds, cyclically attached to M×N corresponding pieces of communication data, such that each of the M pieces of divided signature data is transmitted in each round, attached to a corresponding piece of communication data, each time the corresponding piece of the communication data is generated; and
  receiving means for receiving the communication data together with the divided signature data attached thereto;
  communication data reconstituting means for, each time M×N pieces of communication data constituting the one unit of communication data are received, reconstituting the one unit of communication data from the M×N pieces of communication data received previous to the M×N pieces of communication data constituting the one unit of communication data last received;
  signature-data reconstituting means for reconstituting the signature data from the M pieces of divided signature data cyclically attached to the M×N corresponding pieces of communication data constituting the one unit of communication data last received; and
  verifying means for verifying the reconstituted one unit of communication data by using the reconstituted signature data.

* * * * *